April 15, 1924.
F. MYERS
PNEUMATIC TIRE VALVE
Filed May 11, 1922
1,490,628
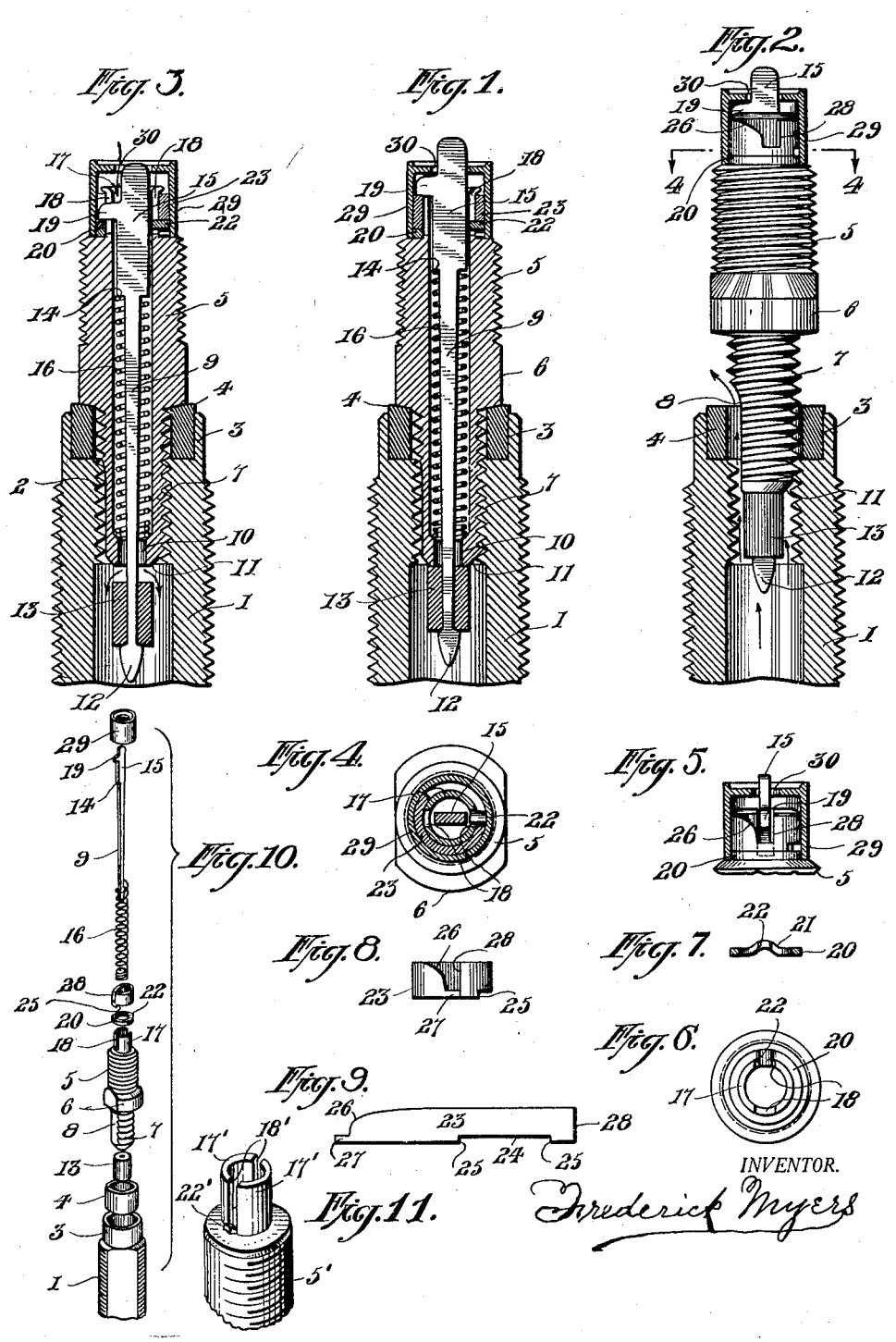

Patented Apr. 15, 1924.

1,490,628

UNITED STATES PATENT OFFICE.

FREDERICK MYERS, OF NEW YORK, N. Y.

PNEUMATIC-TIRE VALVE.

Application filed May 11, 1922. Serial No. 560,082.

*To all whom it may concern:*

Be it known that I, FREDERICK MYERS, a citizen of the United States of America, residing at New York, in the county of New York and State of New York, have invented certain new and useful Improvements in Pneumatic-Tire Valves, of which the following is a specification.

This invention relates to certain new and useful improvements in valves, and has particular reference to that type of valve associated with the pneumatic inner tube of an automobile tire wherein the valve is automatically closed when an air pump is disengaged therefrom.

The primary object of the invention resides in the provision of a valve for pneumatic tires having a valve that is automatically maintained in a closed position by the air pressure in the tire with means associated with the outer end of the valve stem and being manually operable for locking the valve on its seat to prevent movement thereof and also effectively preventing the escape of air within the tire by way of the valve.

Another object of the invention has reference to a tire valve wherein the valve mechanism is bodily removable from a stem casing to permit access readily to either end of the valve mechanism, and also for the purpose of disassembling the same, partial movement of the valve mechanism outwardly of the stem casing providing for the complete exhaustion of air within the tire, while a sealed connection between the valve mechanism and the stem casing prevents the escape of air from the tire.

With the above general objects in view and others that will appear as the nature of the invention is better understood, the same consists in the novel construction, combination and arrangement of parts hereinafter more fully described, illustrated in the accompanying drawing, and pointed out in the appended claims.

In the drawing forming a part of this application and in which like designating characters refer to corresponding parts throughout the several views:

Figure 1 is a vertical sectional view of a tire valve constructed in accordance with the present invention showing the valve and stem in its closed and locked position, Figure 2 is a vertical sectional view showing the valve mechanism partially unscrewed from the casing stem to permit the escape of air from the tire as indicated by arrow lines, Figure 3 is a vertical sectional view showing the valve and stem depressed to unseat the valve upon the stem, Figure 4 is a horizontal sectional view taken on line IV—IV of Figure 2, Figure 5 is a fragmentary side elevational view partly in section showing the slot in cross section and the plunger locking shoulder registering with the slot in the valve casing to permit the plunger and valve to be depressed, Figure 6 is a top plan view of the valve mechanism with the top removed, Figure 7 is a cross sectional view of a ring removed from the valve mechanism, Figure 8 is a side elevational view of the cam locking collar, Figure 9 is a developed plan view of the cam locking collar, Figure 10 is an extended perspective view of all of the parts of the valve mechanism in position to be assembled, and Figure 11 is a fragmentary perspective view of the upper end of the tubular casing of the valve mechanism showing the lug struck out therefrom for limiting rotary movement of the cam locking collar.

The present invention relating to an air valve especially designed for pneumatic tires, the same embodies a valve mechanism removably mounted in a stem casing, the valve mechanism including an automatically spring closed air valve with means associated therewith and carried by the valve mechanism for locking the valve upon its seat to prevent the escape of air thereby. The valve mechanism includes a tubular casing threaded into the casing stem of the valve and having a portion of the external threads thereof interrupted to permit the complete exhaustion of air within the tire when the valve mechanism is partially removed from the stem casing, a flexible washer or disk being interposed between the valve mechanism and stem casing for maintaining the parts in intimate contact to prevent the escape of air therebetween. A stem is resiliently mounted within the tubular casing of the valve mechanism, the inner end of the stem supporting a cushioned valve that engages a seat formed upon the inner end of the tubular casing, the cushioned valve normally occupying a position engaging the valve seat. A diametrically slotted cylindrical extension is carried by the outer end of the tubular casing, and a laterally projecting lug or finger carried by the valve stem is slidable therein, a locking collar being rotatably supported upon the cylindrical extension and having a cam wall in one side thereof cooperating with the finger extension of the valve stem to prevent shifting movement of the valve stem relative to the tubular casing for maintaining the cushioned valve carried by the stem in a closed locked position, the locking collar being operable by a cap frictionally engaging the same and being rotatable therewith.

Referring more in detail to the accompanying drawing, there is illustrated an air valve especially designed for pneumatic tires, the same including an externally threaded casing stem 1 connected to the inner tube of a pneumatic tire in the usual manner, the outer end of the casing 1 being internally threaded as at 2 and having an internal seat 3 for the reception of an annular gasket 4.

The valve mechanism includes a tubular casing 5 provided intermediate the ends thereof with an external wrench engaging surface 6 and carrying an externally threaded extension 7 threaded into the outer end of the stem casing 1, one side of the extension 7 having the threads thereof broken away as at 8 to provide a lateral air passage as indicated in Figure 2 when it is desired to completely exhaust the air from an inner tube, the casing 5 when in its operative position having the shoulder portion 6 thereof engaging the outer edge of the gasket 4 as shown in Figures 1 and 3 to prevent the escape of air from the pneumatic tire.

A valve stem 9 is shiftably mounted within the tubular casing 5, the inner end of the stem 9 extending through an axial opening 10 formed in the inner end of the casing 5 with the inner terminal end of said casing adjacent the opening 10 constituting a valve seat 11. The inner end of the stem 9 projects inwardly of the valve seat and is provided upon the inner terminal end thereof with a spear head 12 for confining a cushion valve 13 upon the stem as clearly illustrated in Figures 1 and 3. The outer end of the stem 9 is shouldered as at 14 to provide a head 15, while a coil spring 16 encloses the stem 9 and engages at its opposite ends the stem shoulders 14 and the inner end of the tubular casing 5.

A locking device is provided for holding the valve stem 9 and the valve 13 locked upon its seat and includes a cylindrical extension 17 carried by the outer end of the tubular casing 5, the extension 17 being diametrically slotted as at 18. A laterally projecting finger 19 is carried by the stem head 15 and is slidably disposed in one of the slots 18 as shown in Figure 3. A ring 20 shown more clearly in Figures 7 and 10 is provided with an upset portion 21 having a lug 22 extending inwardly and outwardly of the side wall of the ring, said ring being slidably mounted upon the cylindrical extension 17 of the casing 5 with the lug 22 extending into one of the slots 18 to prevent rotary movement of the ring relative to the casing extension 17. A locking collar 23 shown more clearly in Figures 8 and 9 is formed of a blank strip of material with a notch 24 cut into the lower side thereof to define spaced shoulders 25, the upper edge of the band 23 having a cam shoulder 26 adjacent one end thereof with a finger extension 27 at the lower edge of the cam surface to be suitably secured to the opposite end wall 28 as by spot welding or otherwise, the locking collar in its circular formation being clearly shown in Figure 8. The collar is mounted upon the cylindrical extension 17 with the upset portion 21 of the ring 20 disposed in the cut away or notched portion 24 in the lower end of the collar. A cap 29 having an opening 30 in the outer end thereof is mounted upon the collar 23 and is frictionally bound thereto, rotary movement of the cap 29 effecting rotary movement of the collar 23 as will at once be obvious.

The several parts of the valve mechanism are assembled in a manner as indicated in Figure 10, and when the collar 23 is shifted to a position to cause the cam shoulder 26 thereof to register with one of the slots 18 in the cap extension 17, the finger 19 carried by the stem head 15 is freely movable in said slot and is in a position to permit inflation of a tire. When the tire is being inflated, the valve 13 occupies the position shown in Figure 3, the stem 9 and valve 13 being freely movable relative to the casing 5. When it is desired to lock the valve 13 to its seat 11 as shown in Figure 1, the cap 29 is rotated and carries therewith the collar 23, the cam surface 26 of the collar being displaced from registration with the adjacent slot 18 of the collar extension 17, the cam face 26 engaging the under sides of the finger extension 19 to cause the finger to ride upon the upper edge of the collar 23 and when so disposed, the stem 9 and valve 13 are held against movement. Rotary movements of the collar 23 are limited by the shoulders 25 at the opposite ends of the notch 24 engaging the upset portion 21 of the ring 20, the limit of movement of the collar in one direction locking the valve stem 9, while the limit of movement of the collar in the other direction prevents the cam surface 26 of the collar for registration with the extension slots 18 to permit movement of the finger 19 and the valve stem carrying the same. In completely deflating the tire, the tubular casing 5 is partially removed from the stem casing 1 as shown in Figure 2 to permit the escape of air through the stem casing as indicated by the arrow lines in Figure 2, the air escaping by way of the interrupted threaded portion 8 of the tubular casing.

A modified form of the invention is shown in Figure 11, wherein the ring 20 is eliminated, the tubular casing 5' carrying a cylindrical extension 17' that is diametrically slotted as at 18', the base wall of one of the slots being provided with a stuck-out lug 22' that is positioned in the notch 24 of the locking collar 23, the remaining parts of the valve mechanism being employed and operating in a manner as above described.

It will therefore be seen that the valve mechanism includes a valve that is automatically closed by air pressure within the tire, and further has means associated therewith that is operable from the outer end of the mechanism casing for locking the valve to its seat to prevent the escape of air by way of the valve.

While the forms of the invention herein shown and described are what is believed to be the preferred embodiments thereof, it is nevertheless to be understood that various forms, modifications and arrangements of the parts may be made without departing from the spirit and scope of the invention as claimed.

What is claimed as new is:—

1. A tire valve comprising a stem casing, a valve mechanism positioned therein, said valve mechanism having a portion of one side cut away to permit complete deflation of the tire when the valve mechanism is partially removed from the stem casing.

2. A tire valve comprising a stem casing, a valve mechanism positioned therein, said valve mechanism having a portion of one side cut away to permit complete deflation of the tire when the valve mechanism is partially removed from the stem casing, and a sealing gasket between the stem casing and valve mechanism.

3. A tire valve comprising a stem casing, a valve mechanism positioned therein, and including a tubular casing having a valve seat at its inner end, a tensioned valve stem in the tubular casing, a valve carried by the inner end of the stem engaging the valve seat, a laterally extending finger carried by the outer end of the valve stem, and rigidly supported means with which said stem finger is moved into engagement for holding the valve locked to its seat.

4. A tire valve comprising a stem casing, a valve mechanism positioned therein, and including a tubular casing having a valve seat at its inner end, a tensioned valve stem in the tubular casing, a valve carried by the inner end of the stem engaging the valve seat, a laterally extending finger carried by the outer end of the valve stem, and a collar having a cut away portion rotatably associated with the stem finger for holding the valve locked to its seat.

5. A tire valve comprising a stem casing, a valve mechanism positioned therein, and including a tubular casing having a valve seat at its inner end, a tensioned valve stem in the tubular casing, a valve carried by the inner end of the stem engaging the valve seat, a laterally extending finger carried by the outer end of the valve stem, a collar having a cut away portion rotatably associated with the stem finger for holding the valve locked to its seat, and means for limiting the rotary movement of the collar.

6. A tire valve comprising a stem casing, a valve mechanism positioned therein, and including a tubular casing having a valve seat at its inner end, a tensioned valve stem in the tubular casing, a valve carried by the inner end of the stem engaging the valve seat, a laterally extending finger carried by the outer end of the valve stem, a collar having a cutaway portion rotatably associated with the stem finger for holding the valve locked to its seat, said collar having an elongated notch in the lower edge thereof defining spaced shoulders, and means cooperating with the shoulders for limiting rotary movement of the collar.

7. A tire valve comprising a stem casing, a valve mechanism positioned therein, and including a tubular casing having a valve seat at its inner end, a tensioned valve stem in the tubular casing, a valve carried by the inner end of the stem engaging the valve seat, a laterally extending finger carried by the outer end of the valve stem, a collar having a cut away portion rotatably associated with the stem finger for holding the valve locked to its seat, said collar having an elongated notch in the lower edge thereof defining spaced shoulders, and a ring having interlocking engagement with the shoulders for limiting rotary movement of the collar.

8. A tire valve comprising a stem casing, a valve mechanism positioned therein, and including a tubular casing threaded into the stem casing, with a portion of the tubular casing threads interrupted to permit deflation of a tire when the valve mechanism is partially removed from the casing, a valve seat at the inner end of the tubular casing and a diametrically slotted cylindrical extension at the outer end thereof, a tensioned valve stem within the casing, a cushion valve secured to the inner end thereof, a laterally projecting finger carried by the outer end of the stem extending into one of the extension slots, and a slotted collar inclosing the cylindrical extension cooperating with the stem finger to control the movement of the stem and the valve carried thereby relative to its seat.

In testimony whereof I affix my signature.

FREDERICK MYERS.